United States Patent [19]

Snapp, Jr. et al.

[11] 3,888,880

[45] June 10, 1975

[54] SYNTHESIS OF DIETHER-ALDEHYDES AND DIETHER-ALCOHOLS

[75] Inventors: Thomas C. Snapp, Jr.; Alden E. Blood, both of Longview, Tex.

[73] Assignee: Eastman Kodak Company, Rochester, N.Y.

[22] Filed: Oct. 30, 1973

[21] Appl. No.: 411,118

[52] U.S. Cl. .......................................... 260/340.6
[51] Int. Cl.$^2$..................................... C07D 319/12
[58] Field of Search ................................ 260/340.6

[56] References Cited
UNITED STATES PATENTS 2,497,303   2/1950   Gresham et al.................. 260/340.6
3,159,653   12/1964  Falbe et al...................... 260/345.9

FOREIGN PATENTS OR APPLICATIONS 941,996   11/1963   United Kingdom .......... 260/604 HF

OTHER PUBLICATIONS

Falbe, Carbon Monoxide in Organic Synthesis, pp. 14 & 15, (1970).
March, Advanced Organic Chemistry : Reactions, Mechanisms and Structure, pp. 609 & 610, (1968).

*Primary Examiner*—Anton H. Sutto
*Attorney, Agent, or Firm*—Edward R. Weber; Daniel B. Reece, III

[57] ABSTRACT

The present invention describes a process for the production of p-dioxanecarboxyaldehyde and p-dioxanemethanol via the hydroformylation and hydrogenation of p-dioxene. The new compound, p-dioxanecarboxyaldehyde, is an intermediate useful in the synthesis of plasticizers and perfumes. p-Dioxanemethanol is a known chemical useful as a plasticizer, surface active agent and in adhesives and urethanes.

1 Claim, No Drawings

SYNTHESIS OF DIETHER-ALDEHYDES AND DIETHER-ALCOHOLS

This invention relates to a novel process for the production of cyclic diether-aldehydes and diether-alcohols. More particularly, this invention relates to a method for the production of the novel compound, p-dioxanecarboxyaldehyde, and p-dioxanemethanol by the hydroformylation and hydrogenation of p-dioxene. p-Dioxanemethanol is a known chemical useful as a plasticizer, a surface active agent and in adhesives and urethanes. A prior method of producing p-dioxanemethanol involved treatment of 2-chloroethyl-2-hydroxy-3-chloropropylether with alkali and heat to yield 2-hydroxymethyl-p-dioxane (p-dioxanemethanol) in approximately 65 percent yield (British Pat. No. 749,713). Another method of synthesis was reported by Kharasch (U.S. Pat. No. 2,434,414) who reacted epichlorohydrin and ethylene glycol in the presence of sulfuric acid to give 3-(2-hydroxyethoxy)-1,2-epoxypropane, which was converted to 2-(hydroxymethyl)-1,4-dioxane (p-dioxane methanol) by potassium hydroxide. Each of the above syntheses to form p-dioxanemethanol involved several reaction steps which resulted in by-products and low yields.

An object of the present invention is to provide a simplified one-step procedure for the synthesis of p-dioxanemethanol.

A further object of the invention is to provide a method of synthesis of the novel compound, p-dioxanecarboxyaldehyde.

Other objects of the invention will become apparent from a consideration of the specification and claims of this application.

In the process of the instant invention, p-dioxene is reacted with a gaseous mixture of carbon monoxide and hydrogen at a temperature fo from about 75° to about 200°C. in the presence of a cobalt catalyst to give either p-dioxanecarboxyaldehyde, p-dioxanemethanol, or a mixture of these products. Yields are generally above 80 percent. The process involves a hydroformylation reaction to give the intermediate p-dioxanecarboxyaldehyde, a novel compound, which may be subsequently converted to the alcohol product by hydrogenation. The hydrogenation reaction is promoted by the cobalt catalyst used in the hydroformylation reaction.

Unexpectedly, hydrogenation of the p-dioxene feed to yield p-dioxane does not occur. This is quite surprising since hydrogenation of p-dioxene to p-dioxane is known to readily occur at high temperatures (100°–200°C.) and pressures (b 500–3,000 psig). In view of the high concentration of hydrogen maintained in the process and the presence of a metal hydrogenation catalyst, one skilled in the art would predict the p-dioxane would be a principal reaction product. Unexpectedly, the hydrogenation reaction is suppressed and the hydroformylation reaction is the predominant reaction.

An advantage of this new process is that the reaction parameters can be altered to produce either the diether-aldehyde or the diether-alcohol. General experimental parameters for this process are a reaction temperature of from about 75° to about 200°C. and a reaction pressure of from about 500 to about 4,000 psig. Typical catalyst concentration is from about 0.01 to about 0.5 percent cobalt, based on the weight of the reaction mixture. The molar gas ratio of carbon monoxide to hydrogen is from about 1:1 to about 1:3, respectively. The reaction is facilitated by the use of an inert solvent. An inert solvent is defined as a material, miscible with the reactants and the products, which does not react with either the reactants or the products under the conditions of the reaction. Suitable solvents include aliphatic and aromatic solvents such as heptane, hexane, cyclohexane, cyclopentane, benzene, toluene, and xylene. Solvennt concentration can be from about 0 to about 75 weight percent of the reaction mixture, preferably from about 25 to about 50 weight percent. Use of a solvent is not required but in many instances the solvent will aid control of the reaction. The cobalt catalyst can be cobalt carbonyl or a cobalt salt of an aliphatic fatty or naphthenic acid. Catalysts found particularly suitable are cobalt acetate, cobalt octoate, cobalt 2-ethylhexanoate, and cobalt naphthenate.

Conditions which are more suitable for synthesis of the dietheraldehyde are a reaction temperature of from about 100° to about 125°C., a carbon monoxide to hydrogen molar ratio of from about 1.0:1.0 to about 1.0:1.4, respectively, and a reaction pressure of from about 2,200 to about 3,000 psig. The cobalt catalyst concentration in the reaction mixture should be from about 0.04 to about 0.2 weight percent, calculated as cobalt metal. The reaction time is usually less than 4 hours so as to reduce hydrogenation of the aldehyde to the alcohol.

Reaction conditions which favor synthesis of the diether-alcohol are a reaction temperature of 125° to 175°C., a carbon monoxide to hydrogen mole ratio of 1.0:1.5 to 1.0:3.0, respectively, and a reaction pressure of from about 3,000 to 3,500 psig. The catalyst concentration of the reaction mixture is from about 0.04 to about 0.4 weight percent, calculated as cobalt metal, and the reaction time should be from about 4 to 12 hours.

The process of the invention is illustrated in greater detail by the following examples, but it will be understood that these examples are not intended to limit the invention in any way and obvious modifications will occur to those skilled in the art.

These examples utilize a stainless steel autoclave wherein the cobalt catalyst, p-dioxene, and inert solvent are mixed before addition to the autoclave. Carbon monoxide and hydrogen are mixed to the desired mole ratio prior to injection into the autoclave. The reaction temperature and pressures are controlled within the range of 100°–200°C. and 1,000 to 3,500 psig, respective.

EXAMPLE 1

This example demonstrates the synthesis of p-dioxanemethanol from p-dioxene. A mixture of 1,500 milliliters of p-dioxene and 50 grams of cobalt naphthenate (0.18 weight percent cobalt based on the weight of reaction mixture) is added to the autoclave. The autoclave is pressured to 1,000 psig with a gas mixture (1 to 2.1 mole ratio of carbon monoxide to hydrogen, respectively) and the contents heated to 150°C. At 150°C. the reactor pressure is maintained at 3,000 psig by the addition of the above gas mixture. After 8 hours the reaction is terminated. Analyses of the reaction mixture show an 83 percent yield to the p-dioxanemethanol. Fractional distillation of the reaction mixture gives a colorless liquid distilling at 66°–68°C. at 20 mm. Hg pressure.

EXAMPLE 2

This example demonstrates the synthesis of the intermediate diether-aldehyde. A mixture of 1,000 milliliters of p-dioxene and 35 grams of cobalt naphthenate (0.19 weight percent cobalt based on the weight of reaction mixture) is charged to the autoclave. A gas having a 1.0 to 1.1 mole ratio of carbon monoxide to hydrogen, respectively, is added to the autoclave to produce a pressure of 1,000 psig. The resulting mixture is heated to 100°C. and the pressure is increased to 3,000 psig by the addition of more of the above gas mixture. After 1 hour at these conditions the reaction product is collected, cooled, and treated with 100 milliliters of an aqueous dilute sulfuric acid solution. Fractional distillation of the organic layer results in an 86 percent yield to p-dioxanecarboxyaldehyde which distills at 45°–47°C. under 2 mm. Hg pressure. This diether-aldehyde is colorless with a pungent odor. Infrared spectroscopy analysis shows the C=O vibrations at 1,730 cm$^{-1}$ which indicate the presence of the diether-aldehyde.

EXAMPLE 3

This example demonstrates the use of a solvent in the synthesis of p-dioxanemethanol. A mixture of 800 grams of benzene, 800 grams of p-dioxene, and 20 grams of cobalt naphthenate (0.075 weight percent cobalt based on the weight of the reaction mixture) is charged to the autoclave. A mixture of carbon monoxide and hydrogen in a 1.0 to 1.5 mole ratio, respectively, is used to pressure the autoclave to 1,000 psig. The resulting mixture is heated to 150°C. and then the pressure increased to 3,000 psig by the introduction of additional quantities of the above gas mixture. The reaction is continued for 7 hours at 3,000 psig. The product yield to p-dioxanemethanol is 84 percent based on fractional distillation of the crude autoclave mixture.

EXAMPLE 4

This example demonstrates the use of cobalt linoleate catalyst in the synthesis of p-dioxanemethanol. A mixture of 1,500 milliliters of p-dioxene and 40 milliliters of cobalt linoleate (0.35 weight percent cobalt based on the weight of the reaction mixture) is charged to an autoclave. Pressure in the autoclave is adjusted to 1,000 psig with a gas having a 1.0 to 2.8 mole ratio of carbon monoxide to hydrogen, respectively. After heating to 150°C., the gas pressure is increased to 3,000 psig by the introduction of additional quantities of the aforementioned mixture of CO and $H_2$. After 6 hours at these conditions the reaction is stopped. The catalyst is inactivated by treatment with a dilute sulfuric acid solution. Fractional distillation of the crude autoclave mixture affords an 82 percent yield to p-dioxanemethanol.

EXAMPLE 5

This example shows the synthesis of coproducts (both p-dioxanecarboxyaldehyde and p-dioxanemethanol) by proper control of the reaction parameters. A mixture of 800 grams of benzene, 800 grams of p-dioxene, and 20 grams of cobalt naphthenate (0.075 weight percent cobalt based on the weight of the reaction mixture) is charged to an autoclave. Pressure in the autoclave is adjusted to 1,000 psig with a gas having a 1.0 to 1.2 mole ratio of carbon monoxide to hydrogen, respectively. After heating to 125°C., the gas pressure is increased to 3,000 psig by introduction of additional quantities of the aforementioned mixture of CO and $H_2$. After 4 hours at these conditions the reaction is stopped. The catalyst is inactivated by treatment with a dilute sulfuric acid solution. Fractional distillation of the crude reaction mixture affords a 47 percent yield to p-dioxanecarboxyaldehyde and a 36 percent yield to p-dioxanemethanol.

This invention has been described in detail with particular reference to preferred embodiments thereof, but it will be understood that variations and modifications can be effected within the spirit and scope of the invention as described hereinabove.

We claim:
1. The compound p-dioxanecarboxyaldehyde.

* * * * *